(12) United States Patent
Mangat et al.

(10) Patent No.: US 9,462,346 B2
(45) Date of Patent: Oct. 4, 2016

(54) CUSTOMIZABLE CHANNEL GUIDE

(71) Applicant: Microsoft Corporation, Redmond, WA (US)

(72) Inventors: Preetinderpal Singh Mangat, Surrey (CA); Peter Duyen Hung Hoang, Delta (CA); Daniel Frank, North Vancouver (CA); Shannon Yen Yun Lee, Vancouver (CA); Joshua Trusz, Vancouver (CA); Sang Young Park, Burnaby (CA); Daniel Daigle, Vancouver (CA); Helen Joan Hem Lam, Richmond (CA); William Michael Mozell, North Vancouver (CA); David Seymour, Vancouver (CA); Cody Kenneth Snyder, Maple Ridge (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 40 days.

(21) Appl. No.: 14/199,811

(22) Filed: Mar. 6, 2014

(65) Prior Publication Data

US 2014/0325567 A1 Oct. 30, 2014

Related U.S. Application Data

(60) Provisional application No. 61/816,687, filed on Apr. 26, 2013.

(51) Int. Cl.
*H04N 21/482* (2011.01)
*H04N 21/2668* (2011.01)
(Continued)

(52) U.S. Cl.
CPC ........ *H04N 21/482* (2013.01); *H04N 21/2668* (2013.01); *H04N 21/4314* (2013.01); *H04N 21/4532* (2013.01); *H04N 21/4755* (2013.01)

(58) Field of Classification Search
None
See application file for complete search history.

(56) References Cited

U.S. PATENT DOCUMENTS

| 5,734,720 A | 3/1998 | Salganicoff |
| 5,978,043 A | 11/1999 | Blonstein et al. |

(Continued)

FOREIGN PATENT DOCUMENTS

| WO | 03043318 A1 | 5/2003 |
| WO | 2007/034467 A2 | 3/2007 |

OTHER PUBLICATIONS

"Customize Your Own TV Schedule & Listings", Published on: Jul. 8, 2010, Available at: http://www.dominatetv.com/.

(Continued)

*Primary Examiner* — Omar S Parra
(74) *Attorney, Agent, or Firm* — Aaron Chatterjee; Judy Yee; Micky Minhas

(57) ABSTRACT

Methods and systems for providing a customizable channel guide, and more specifically, a personalized channel guide for a user, are disclosed herein. In an embodiment, indications of types of content for which the user has an interest are received. Information about content that is available for viewing is accessed. Personalized channels for the user are generated based on the received indications of the types of content for which the user has an interest and based on the information about content that is available for viewing. Each separate personalized channel provides the user with access to a separate type of content for which the user has an interest. A listing of at least some of the personalized channels is displayed to thereby enable the user to select one of the personalized channels.

20 Claims, 13 Drawing Sheets

(51) Int. Cl.
*H04N 21/45* (2011.01)
*H04N 21/475* (2011.01)
*H04N 21/431* (2011.01)

(56) References Cited

U.S. PATENT DOCUMENTS

| | | | |
|---|---|---|---|
| 6,163,316 | A | 12/2000 | Killian |
| 6,898,762 | B2 | 5/2005 | Ellis et al. |
| 7,779,441 | B2 * | 8/2010 | Grooters ................... 725/48 |
| 8,255,953 | B1 | 8/2012 | Rowson et al. |
| 2002/0009283 | A1 | 1/2002 | Ichioka et al. |
| 2005/0210510 | A1 | 9/2005 | Danker |
| 2007/0074245 | A1 * | 3/2007 | Nyako ............... H04N 5/44543 725/34 |
| 2007/0143793 | A1 | 6/2007 | Barrett et al. |
| 2008/0209474 | A1 | 8/2008 | Pjanovic et al. |
| 2008/0229359 | A1 * | 9/2008 | Robinson ................... 725/46 |
| 2008/0271078 | A1 * | 10/2008 | Gossweiler ........ H04N 5/44543 725/40 |
| 2008/0271080 | A1 | 10/2008 | Gossweiler et al. |
| 2010/0251304 | A1 * | 9/2010 | Donoghue et al. ............. 725/46 |
| 2010/0299701 | A1 | 11/2010 | Liu et al. |
| 2011/0030010 | A1 * | 2/2011 | Overbaugh ................... 725/45 |
| 2013/0019263 | A1 | 1/2013 | Ferren et al. |

OTHER PUBLICATIONS

Zhang, et al., "Personalized TV Program Recommendation based on TV-Anytime Metadata", In Proceedings of the Ninth International Symposium on Consumer Electronics, Jun. 14, 2005, 5 pages.
"International Search Report & Written Opinion for PCT Patent Application No. PCT/US2014/035212", Mailed Date: Jul. 15, 2014, Filed Date: Apr. 24, 2014, 11 Pages.
Amendment filed Nov. 17, 2014, in PCT Patent Application No. PCT/US2014/035212 filed Apr. 24, 2014.
"Second Written Opinion Issued in PCT Application No. PCT/US2014/035212", Mailed Date: Mar. 31, 2015, 7 Pages.
International Preliminary Report on Patentability dated Jul. 30, 2015, International Application No. PCT/US2014/035212.

* cited by examiner

CUSTOMIZABLE CHANNEL GUIDE

PRIORITY CLAIM

This application claims priority to U.S. Provisional Patent Application No. 61/816,687, filed Apr. 26, 2013, which is incorporate herein by reference.

BACKGROUND

While watching video content on a television (TV), the current method of browsing for other content typically involves a user having to navigate through a grid of hundreds of channels, many of which the user does not have sufficient authentication, or manually entering channel numbers from memory. Further, even when the user does have sufficient authentication to view channels, there are typically numerous channels and content associated therewith for which the user does not have any interest, which distract the user from the channels and content for which the user may have an interest.

SUMMARY

A system is provided that allows users to organize and more easily access desired content. In embodiments, the system includes a user interfaces (UI) channel guide brought up while watching video content, that serves as a channel listing categorized by genres or sub-categories that best represents the media application. For example, in ESPN, the channels may be leagues/sports such as NFL, NBA, MLB, NCAAF, etc., with the content for that sport surfaced in that channel.

Furthermore, the channel listing consists of system channels such as recommendations, popular, recently watched by friends, which aggregate video content based on these criteria. This channel listing is customizable by the user; channels can be added or removed by the user and/or based on the user's preference. Furthermore, the content within the channel can be customized to prioritize certain types of content before others. Again, using the ESPN example, in the NBA channel, the user can specify their favorite teams for which content will surface to the front of the queue.

In an embodiment, indications of types of content for which the user has an interest are received, e.g., via a user interface and/or based on a user's viewing habits over time. Information about video content that is available for viewing is accessed. Personalized channels for the user are generated based on the received indications of the types of content for which the user has an interest and based on the information about content that is available for viewing. Each separate personalized channel provides the user with access to a separate type of content for which the user has an interest. A listing of at least some of the personalized channels is displayed to thereby enable the user to select one of the personalized channels. This can involve displaying along a first one of the four sides of a screen, the listing of at least some of the personalized channels, and displaying along a second one of the four sides of the screen (which is perpendicular to the first one of the first sides), a listing of content associated with one of the personalized channels. Within a remaining portion of the screen, video content that the user most recently selected for viewing is displayed. This way, the user can enjoy viewing video content while navigating their personalized channel guide.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

Systems and methods that allow users to generate efficient and customized UI channel guides are disclosed herein. In embodiments, the UI channel guide may be brought up by a user while watching video content, which is often referred to herein simply as content. The UI channel guide serves as a channel listing categorized by channels which may be genres or sub-categories that represent the media application providing the content. However, the channels need not represent the media application providing the content in further embodiments, and may be any user-defined channels as explained below.

Figure 1:
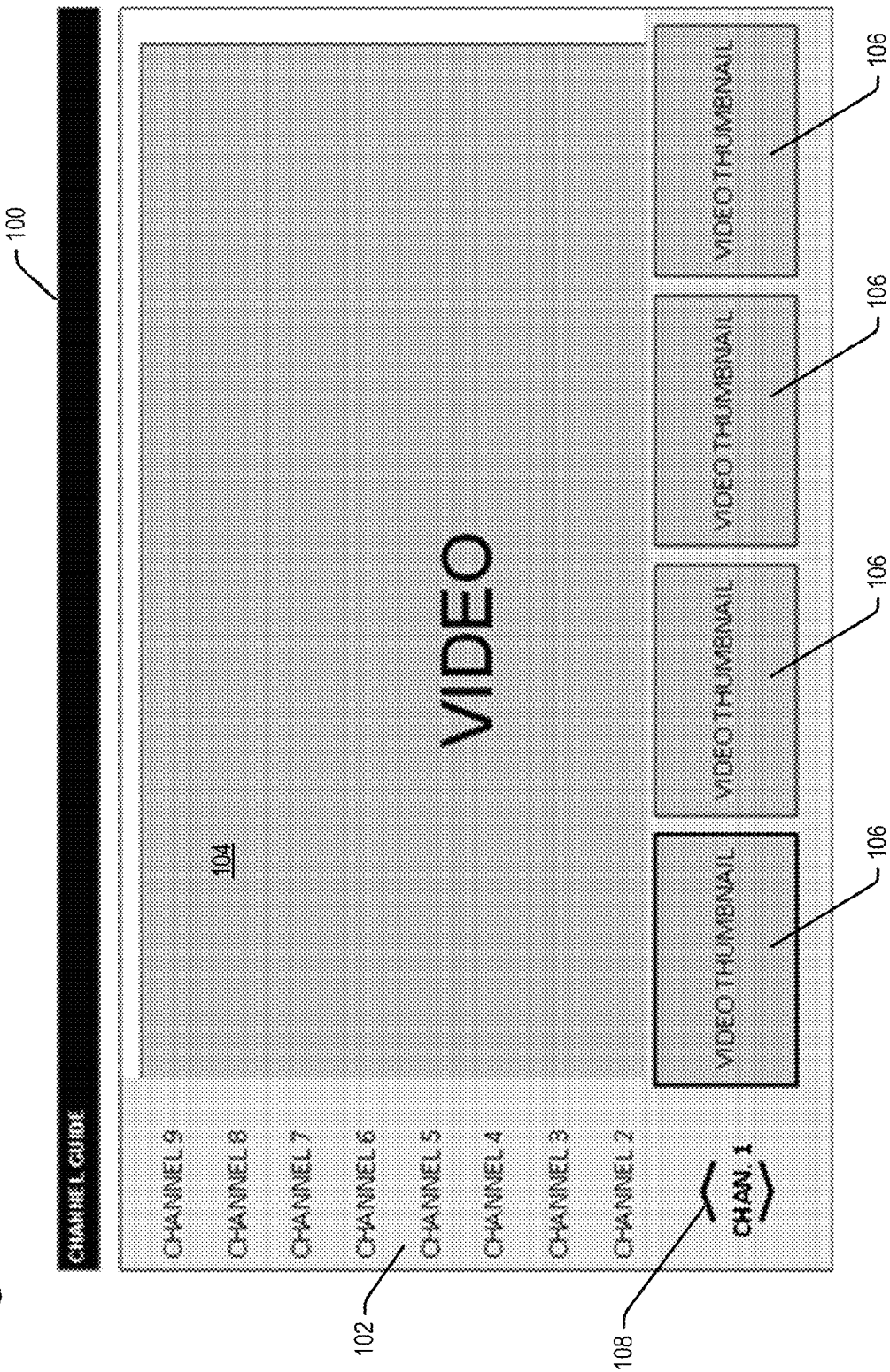
FIGS. 1-7 depict graphical user interfaces according to embodiments of the present disclosure.

FIG. 1 illustrates a user interface 100 including a UI channel guide 102, video content 104 and alternative video content thumbnails 106. Such a UI channel guide 102 can be displayed in response to a user selecting or requesting that the guide be displayed. Such a selection or request can be performed by a user using a handheld device (e.g., such as a remote control or game controller), using gestures and/or using auditory commands, but is not limited thereto. The UI channel guide 102 can thereafter stop being displayed in response to the user selecting or requesting that the guide be exited, after a time-out period, or in response to the user selecting or requesting that the video content 104 being displayed be changed to other video content.

As shown, the UI channel guide 102 is provided alongside the video content 104 so that a user may view the video content 104 while at the same time viewing and navigating the channel guide 102. In accordance with an embodiment, while the UI channel guide 102 is displayed on a screen, the amount of screen space devoted to displaying video content 104 is at least fifty percent of the entire screen, thereby enabling the user to simultaneously view and navigate the UI channel guide 102 while still enjoying the video content 104. By contrast, other on-screen channel guides typically occupy the entire screen, or reduce the video content to less than twenty five percent of the screen, which makes the actual video content difficult to view.

The video content thumbnails 106 may include additional content for one of the channels. Any one of the video content thumbnails 106 may be selected, at which time the video content represented by the selected thumbnail 106 is displayed as a larger video content 104. More specifically, each video content thumbnail 106, which can also be referred to as a tile 106, corresponds to different content associated with one of the channels of the channel guide 102. In this example, the video content thumbnails 106 correspond to "channel 1". If a user was to navigate to "channel 2," then the video content thumbnails 106 would correspond to content associated with "channel 2." The user may also be able to select or request information about one of the video content thumbnails 106, so that they can learn more about the video content represented by the video content thumbnail 106, before they decide whether or not they want to select the associated video content for viewing. Each tile 106 can provide an indication of the content that would be presented if the tile 106 were selected by the user. For example, each tile 106 can provide text and/or an image that corresponds to the content represented by the tile. For example, if a tile 106 corresponded to an NFL football game between the Seattle Seahawks and the San Francisco 49ers, then that tile 106 can include the text "Seahawks vs. 49ers" and/or can include an image of the logos or helmets of the two teams.

In accordance with an embodiment, the listing of channels (or a portion thereof) is displayed along a first one of the four sides of a screen, and a listing of content associated with one of the channels (or a portion thereof) is displaying along a second one of the four sides of the screen, which is perpendicular to the first one of the four sides. For example, as shown in FIG. 1, the listing of channels is shown along the left side of the screen, and the listing of content associated with one of the channels (channel 1, in this example) is displaying along the bottom side of the screen, which is perpendicular to the left side of the screen. In FIG. 1, the listed channels are arranged in a column, and the listed content associated with one of the channels (which are the video content thumbnails 106, in this example) is arranged in a row. Still referring to FIG. 1, video content 104 that the user most recently selected for viewing is displayed within the remaining portion of the screen. As mentioned above, in an embodiment, the portion of the screen that displays the video content 104 (while the channel guide is simultaneously displayed) takes up at least fifty percent of the entire screen, so that the user can still view the video content 104 without having to strain their eyes or miss out on details of the video content 104.

The listing of channels can be displayed along one of the other sides of the screen (e.g., the right side), and the listing of content associated with one of the channels can be displaying along the bottom side of the screen or the top side of the screen (which is perpendicular to the right side of the screen). It is also possible that the listing of channels can be displayed along the bottom (or top) of the screen, and the listing of content associated with one of the channels can be displaying along the right (or left) side of the screen. Other variations are also possible, and within the scope of an embodiment. Preferably, the channels and content associated with one of the channels are displayed in a manner that still enables the user to view the video content 104, as is the case in FIG. 1.

The UI channel guide 102 in FIG. 1 is shown as including nine channels, but there may be greater or fewer channels in further embodiments. When not all channels may be displayed at the same time, a scrollbar 108 is provided for scrolling between the channels or to additional channels. Another scrollbar (not shown) can be used to enable the user to scroll through additional video content thumbnails 106, or more generally, to enable the user to learn about further video content options associated with a particular channel.

Figure 2:
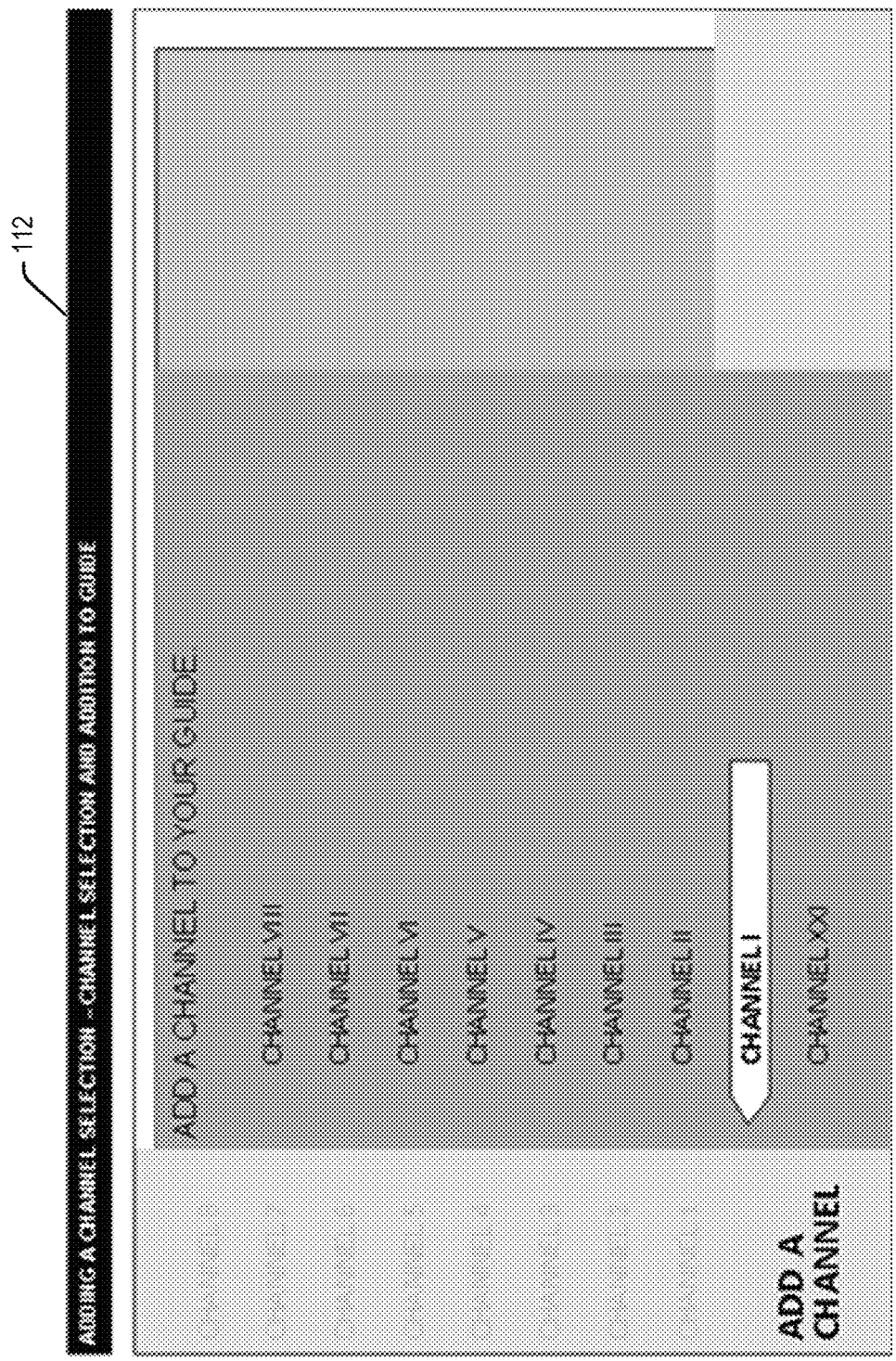
Figure 3:
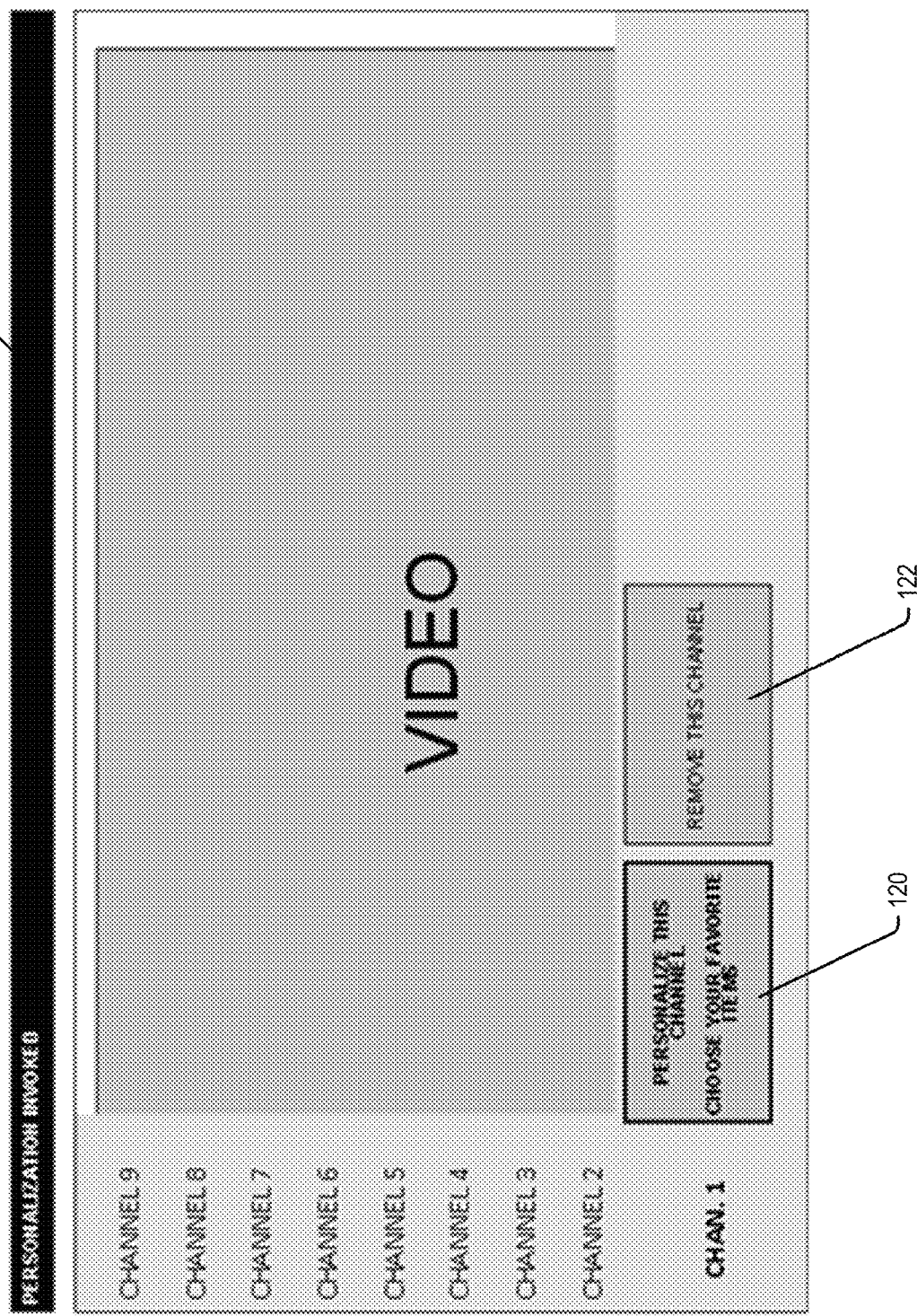
Figure 4:
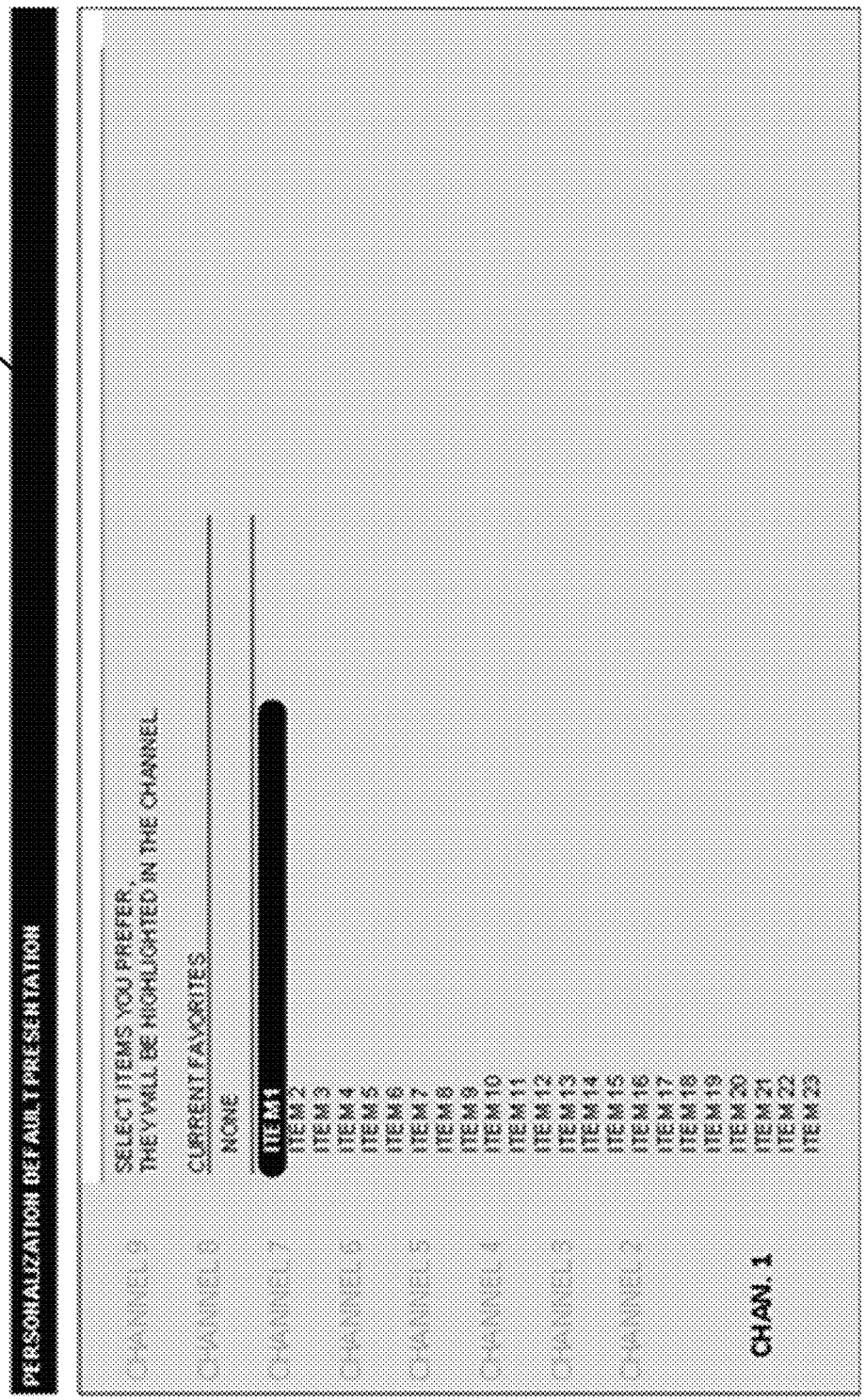

A default number and genre of channels may be provided by the content provider in the UI channel guide 102. However, a user may also customize the number and genre of channels in the UI channel guide 102 to add to or replace channels in the UI channel guide 102. For example, FIGS. 2-4 illustrate user interfaces that allow a user to add and customize a new channel to the UI channel guide 102 shown in FIG. 1. In FIG. 2, a user may select a new channel to be added to the UI channel guide 102 from a user interface 112.

A user may also access a user interface 116 shown in FIG. 3, which allows the user to customize (e.g., personalize) an existing channel upon selection of a content customization button 120. A user is also provided with the option to remove a given channel via a channel removal button 122. Alternatively, or additionally, a channel may be removed in response to a user changing their preferences. Where a user selects the content customization button 120 with respect to a given channel, a user may be presented with the graphical user interface 130 shown in FIG. 4. Referring to FIG. 4, the user interface 130 may include a number of items which may be subcategories of the given channel. The subcategories (more generally shown as item 1 through item 23 in FIG. 4) can be any of various subcategories including for example teams for a sports channel, shows for a sitcom channel, and TV personalities for an entertainment channel. These subcategories are provided by way of example only and any of a wide variety of subcategories may be provided as items on the user interface 130. A user may choose one or more items from the user interface 130, which items will then be used to determine the content provided on the given channel.

The items chosen from the user interface 130 may be considered favorites of the user. Thus, a favorites channel is not a separate entity which lives away from the main channel guide, but rather is incorporated right into the UI channel guide 102.

The content within a channel can be customized to prioritize certain types of content over others. Where a user chooses more than one item using the user interface 130, the order in which the items are chosen may set the order of priority for content served on that channel. For example, if the user selects item 1, item 5 and item 10, in that order, content appropriate the subcategory of item 1 may be displayed first, content appropriate the subcategory of item 5 may be displayed second, and content appropriate subcategory of item 10 may be displayed third. The order in which items are selected may also or alternatively set how much content from each item is displayed on the channel. For example, if the user selects item 1, item 5 and item 10, in that order, the channel may include more content from subcategory of item 1 than items 5 or 10, and the channel may include more content from the subcategory of item 5 than item 10.

As noted above, a user may set favorite items (subcategories) of content which receives the highest priority of content served on a channel. In addition to favorites, other criteria may be used for serving content on a channel. For example, popular and trending content may be served on a channel, and prioritized on the channel above or below favorite items of content. As a further example, friend-recommended content may be served on a channel, and prioritized on the channel above or below favorite items of content and above or below trending content.

The different sources of content described above may each be provided and prioritized on a single channel. In further embodiments, each of the sources of content described above may have its own channel.

Figure 5:
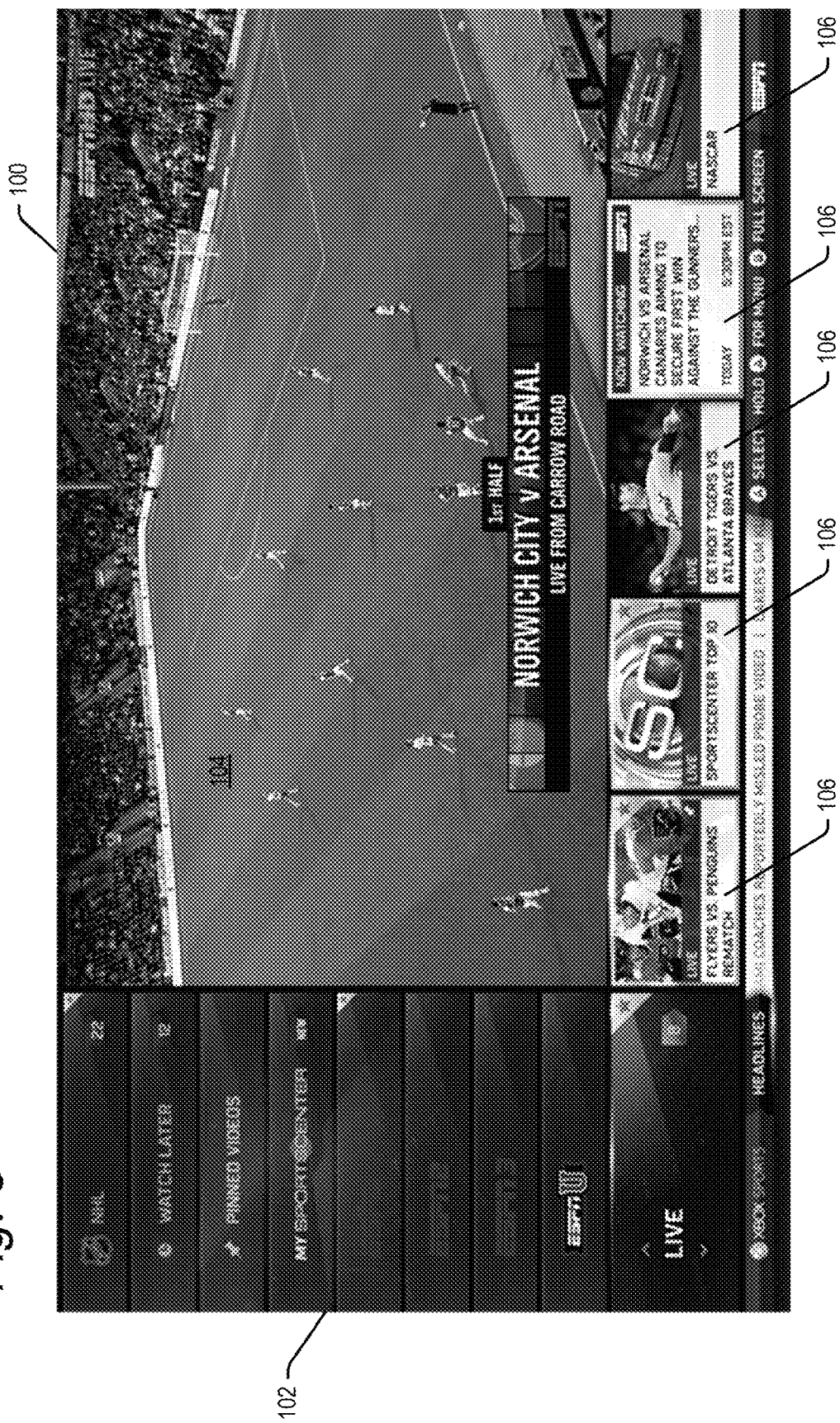

FIG. 5 illustrates an example user interface 100 (similar to FIG. 1) where a content provider may be ESPN, which focuses on sports-related programming including live and recorded event telecasts, sports talk shows, and other original sports related programming. The channels in the UI channel guide 102 may be leagues/sports such as the National Football League (NFL), National Basketball Association (NBA), Major League Baseball (MLB), National College Athletic Association Football (NCAAF), etc. In an embodiment, where a given channel is selected, the content for that sport is displayed or surfaced in video content 104. Other content for that channel may be displayed in the thumbnails 106. As noted, a user can change which video content 104 is displayed by selecting one of the thumbnails 106. The thumbnails 106 may display content from different channels in further embodiments.

Figure 6:
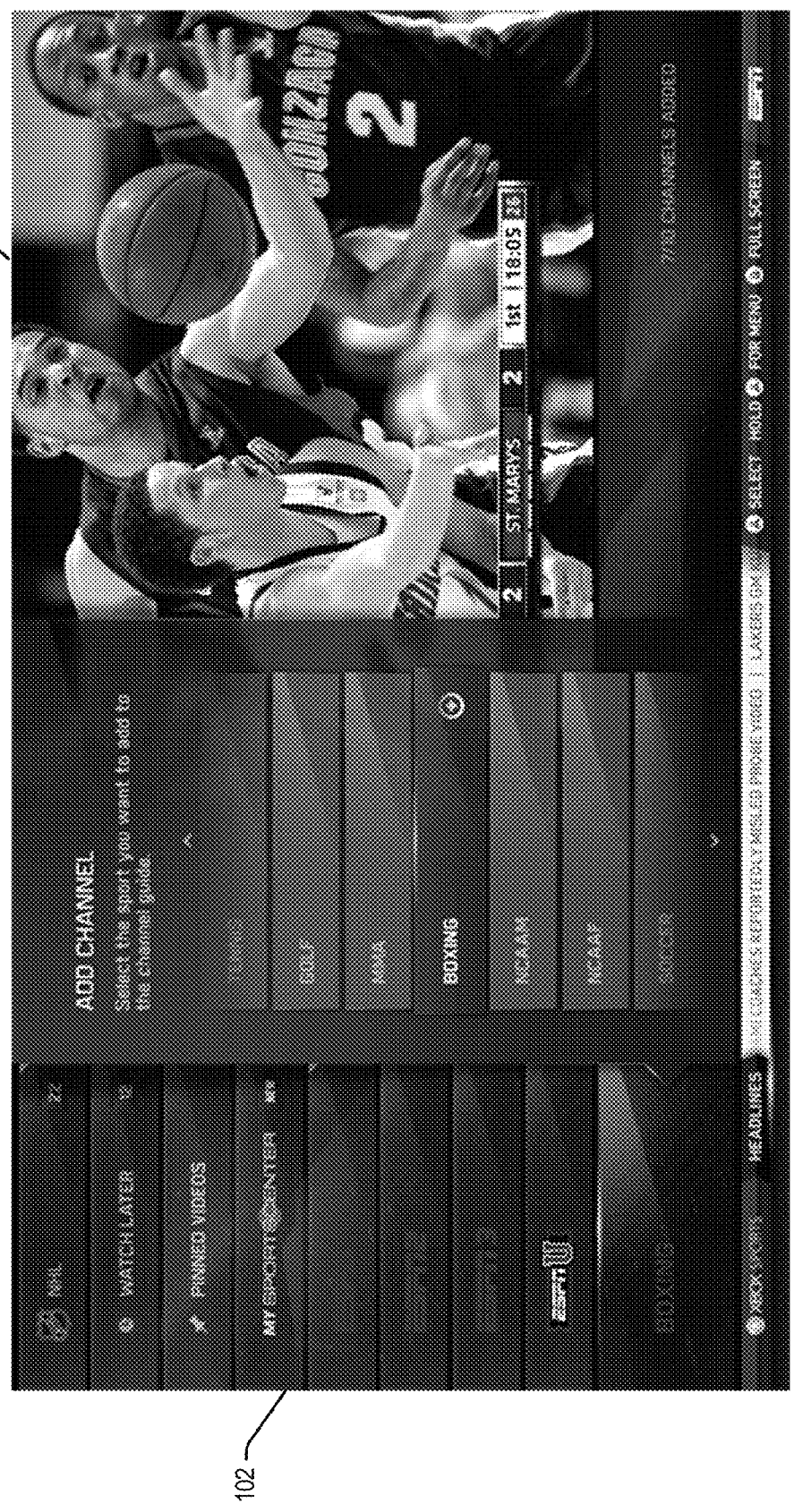

FIG. 6 illustrates an example of the user interface 112 (similar to the interface 112 in FIG. 2) for adding a new channel to the UI channel guide 102. In this example, the content provider may be again ESPN, and the list of channels to add may all relate to sports. In the example of FIG. 6, a user may select boxing to be created as a new channel, at which time, the boxing channel is added to the UI channel guide 102.

Figure 7:
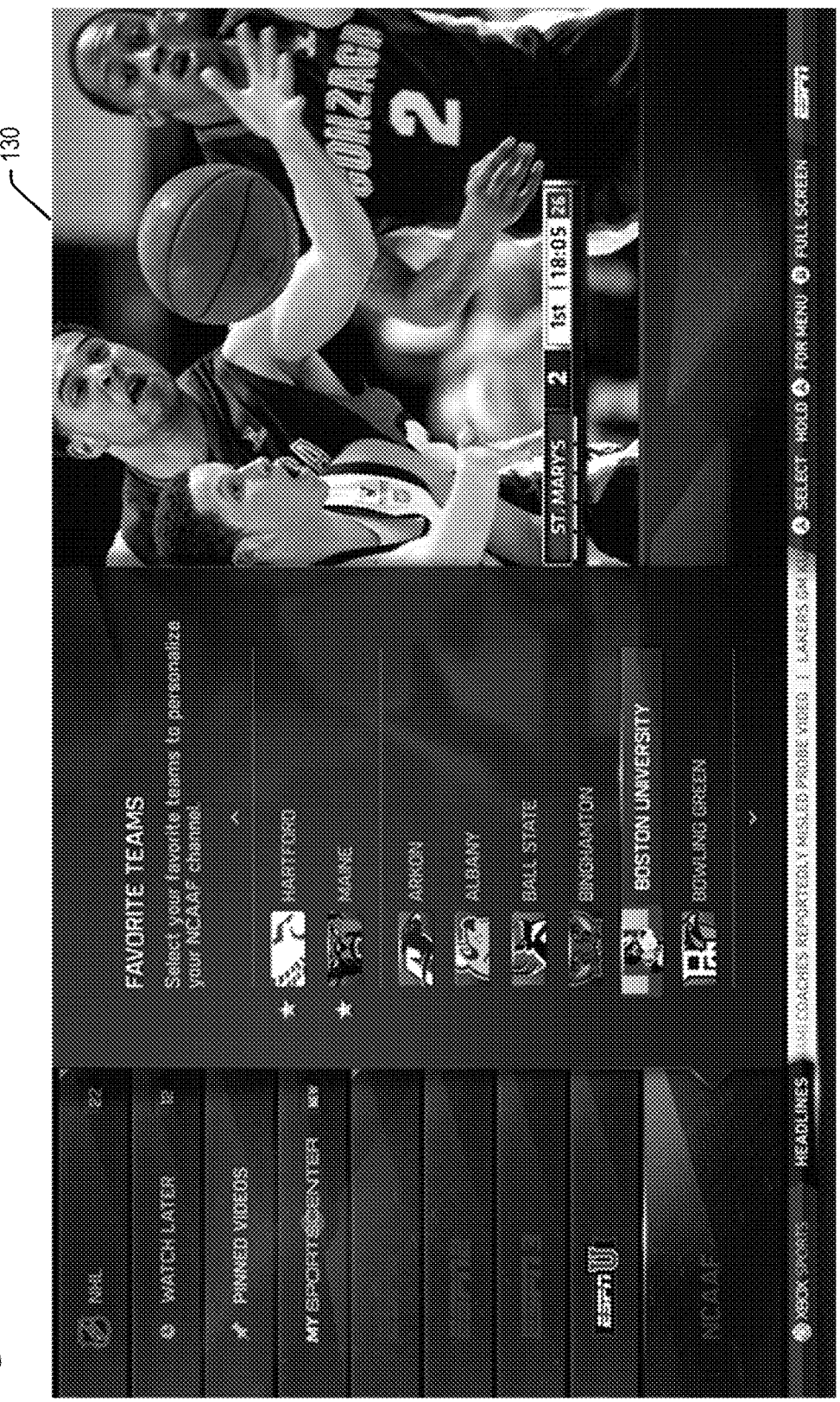

FIG. 7 illustrates an example of the user interface 130 (similar to the user interface 130 in FIG. 4) where a user is given the option to select one or more subcategories setting the content or priority of content to be displayed on a given channel. In the example of FIG. 7, the user is given the option to select one or more favorite teams from an NCAAF channel. The user has for example selected Boston University, so that content related to Boston University will be displayed and/or prioritized on the NCAAF channel.

In accordance with certain embodiments, the UI channel guide (e.g., 100) is made available by downloading an application to a client computing device (which can also be referred to as a computing system) that interfaces with an audio/visual device that includes a screen for displaying video content (such as a television, a monitor, a high-definition television (HDTV), or the like), projects video content, or otherwise makes video content available for viewing. In certain embodiments, different content provides may have their own media applications available for download, with each media application implementing its own UI channel guide. For example, there may be an ESPN™ application available for download that provides for a UI channel guide that is tailored to the ESPN family of channels and the available content associate therewith. For another example, there may be an NFL™ network application available for download that provides for a UI channel guide primarily dedicated to providing content associated with the National Football League (NFL™) These are just a few examples, which are not meant to be all encompassing. It is also possible that such applications are included in client computing devices when they are sold, or are made available to client computing devices in other manners.

Referring again to FIG. 5, illustrated therein is an example of what a UI channel guide 100 may look like where the user is a sports fan. More specifically, FIG. 5 illustrates an exemplary UI channel guide 100 that may be made available if an ESPN application is downloaded by a user to their client computing device, e.g., their gaming console. The exemplary channels shown in FIG. 5 include a National Hockey League (NHL) channel, a Watch Later channel, a Pinned Videos channel, a My SportsCenter channel, an ESPN channel, an ESPN2 channel, an ESPN3 channel, an ESPNU channel, and a Live channel.

In accordance with an embodiment, live content (i.e., content currently being broadcast) can be accessed using a Live channel, such as the one illustrated at the bottom of the screen in FIG. 5. More specifically, when the user navigates to the Live channel, the thumbnails (a.k.a. tiles) 106 will indicate various live content (e.g., live video content) that are available for viewing. In an embodiment, the particular live content shown in the thumbnails 106 are tailored and prioritized for the user, e.g., based on preferences entered by the user (e.g., using the user interface 130) and/or based on tracked viewing habits of the user. For example, if the user indicated that their favorite sport is NHL hockey, and that their favorite team is the Philadelphia Flyers, then a thumbnail 106 indicating that an NHL hockey game involving the Philadelphia Flyers may be listed first when such a game is being shown live, as shown in FIG. 5.

Figure 8:
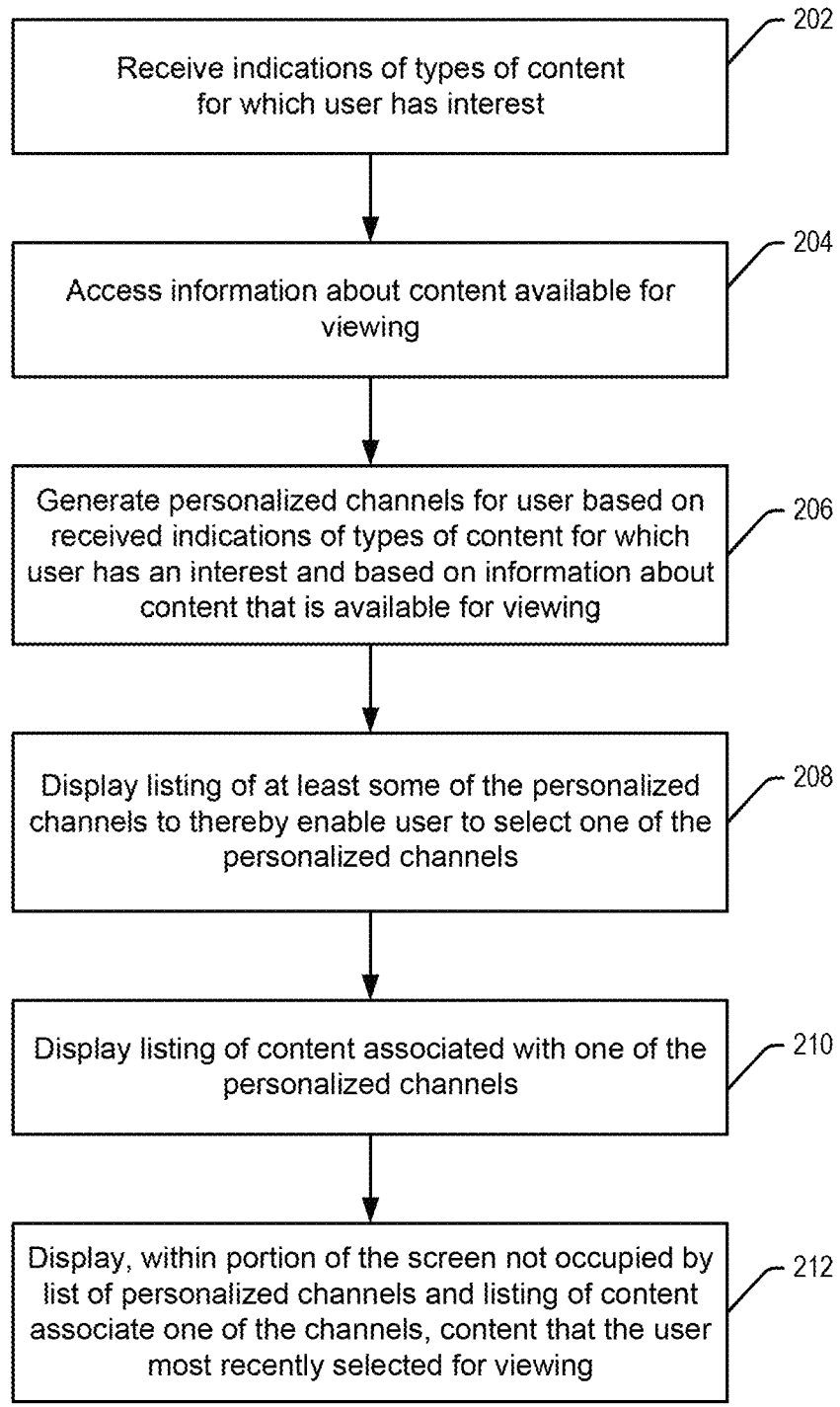
FIGS. 8-10 are high level flow diagrams that are useful for explaining methods according to various embodiments of the present disclosure.

FIG. 8 will now be used to summarize methods for providing a personalized channel guide to a user, according to certain embodiments. Referring to the flow diagram of FIG. 8, at step 202, indications of types of content for which the user has an interest are received. Types of content can include video content, textual content (e.g., statistical content, scores, or leaderboards) and/or interactive content (e.g., polls), but is not limited thereto. Other exemplary types of content include games and advertisements. Types of content can also include specific categories of the aforementioned content, such as video content related to a specific sport, such as NFL football, NBA basketball, or MLB baseball. Other examples of types of content include, but are not limited to, fantasy sports league content (e.g., fantasy football rosters, scores and/or highlights). An individual channel can include a single one of the aforementioned types of content, e.g., just video content, or can include a mixture of different types of content, e.g., video content, textual content and interactive content. In accordance with an embodiment, such indications of types of content for which the user has an interest can be received from a user using a user interface, such as the user interface 130 described with reference to FIGS. 4 and 7. As mentioned above, the user interface 130 described with reference to FIGS. 4 and 7 may be presented to a user in response to the user selecting the content customization button 120 discussed with reference to FIG. 3. Additionally, or alternatively, the user's viewing habits can be tracked, and the user's viewing preferences can be determined based on the various content that the user has viewed over time. For example, if it is determined that the user spends most of their viewing time viewing NFL related content, then it can be determined that the user has the most interest in viewing NFL games. If the NFL games the user watches most often involves a specific team playing, such as the Seattle Seahawks, then it can be determined that the user has a preference for watching that particular team. Receiving an indication that a user has interest in NFL games is an example of receiving indications of types of content for which the user has an interest. Receiving an indication that the user has interest in a specific NFL football team, such as the Seattle Seahawks, is an example of receiving an indication of at least one sub-type of content for which the user has a preference. In accordance with an embodiment, information about the types of content for which the user has an interest, which is obtained at step 202, can be stored in one or more storage devices (e.g., memory). Such storage device(s) can be part of the same system that provides the user interface, and/or can be remotely located. For example, such information can be stored in local memory or in a local hard drive and/or on cloud servers or other remote servers, but are not limited thereto.

Where multiple users may view content using a same system, the system may ask the user to enter their identity, or the system can identify the user using a camera component (e.g., 423) or a microphone (e.g., 430). This way, the channel guide presented to the user can be specific to the user. If the system determines that more than one user is simultaneously viewing content using the system, then the system can ask which user's preferences should be used when presenting the channel guide. Alternatively, the system can provide a channel guide that is personalized for multiple users. For example, a first group of channels can be personalized for a first user, and a second group of channels can be personalized for a second user.

If an indication of at least one sub-type of content for which the user has a preference was received, e.g., as part of step 202, then the generating of personalized channels can also be based on the sub-types of content for which the user has an interest. For example, if there was an indication that the user has interest in a specific NFL football team, such as the Seattle Seahawks, then this information can be used when generating personalized channels. For example, a Seattle Seahawks channel may be generated. Additionally, or alternatively, such information about the user's preferences can be used to order or otherwise prioritize the listing of the content associated with a channel. For example, video content thumbnail 106 indicating that a Seattle Seahawks game is being broadcast may be listed first in an NFL channel and/or in a live channel.

Referring again to FIG. 8, at step 204, information about content that is available for viewing is accessed. Such information, which can be aggregated by cable or satellite television providers or other third parties, as is well known in the art, can be accessed using the Internet and/or some other network. It is also possible that such information is available directly from content providers, such as ESPN or the NFL network. The content that is available for viewing can be "live" content, which refers to content this is presently being broadcast or streamed, but is not necessarily being generated at the present time (e.g., there may be a tape delay, or the content can be produced at a time prior to its broadcast time or scheduled stream time). Additionally, content that is available for viewing can include non-live content, such as prerecorded content that is available for download or streaming on-demand. The information that is accessed at step 204 can be stored in one or more storage devices (e.g., memory). Such storage device(s) can be part of the same system that provides the user interface, and/or can be remotely located. For example, such information can be stored in local memory or in a local hard drive and/or on cloud servers or other remote servers, but are not limited thereto.

At step 206, personalized channels are generated for the user based on the received indications of the types of content for which the user has an interest (received at step 202) and based on the information about content that is available for viewing (accessed at step 204). In an embodiment, each separate personalized channel provides the user with access to a separate type of content for which the user has an interest. For example, a football channel may provide the user with access to live and pre-recorded football games, as well as talk shows about football, and the like. A separate baseball channel may provide the user with access to live and pre-recorded baseball games, as well as talk shows about baseball, and the like. Step 206 can be performed, e.g., by one or more processors that execute instructions stored on one or more processor readable storage devices, which such processor(s) have access to the indications received at step 202 and the information accessed at step 204.

If the user subscribes to a fantasy sports league, such as a fantasy football league, then a fantasy football channel can be generated at step 206. Such a fantasy football channel can, for example, provide the user with highlights and or other information related to players included on the user's fantasy football team. For example, if the user participates in an ESPN fantasy football league, and an ESPN application generates the personalized channels at step 206, then that application will have access to data that specifies which players are included on the user's fantasy football team, and the application can search for or filter football related content in order to identify content that includes or is related to player's on the user's fantasy football team. In an embodiment, one of the video thumbnails (e.g., 106) corresponding to a fantasy football channel provides access to one or more web pages that show points and/or other statistics associated with the user's fantasy football team. Another thumbnail, or more generally another content selection button, can provide access to games that include players on the user's fantasy team. A further thumbnail or button can provide the user with access to highlights including players on the user's fantasy team.

An example of another personalized channel is a sitcom channel, which can provide a user with access to situation comedies (also known as sitcoms) for which the user has indicated an interest using a user interface or by their viewing habits. In accordance with an embodiment, there can be a separate sitcom channel associated with different broadcast or other networks. For example, there can be a CBS sitcom channel, and a separate NBC sitcom channel. In an alternative embodiment, sitcoms produced by different networks can be included in the same sitcom channel. Examples of other personalized channels include, but are not limited to, a drama channel, a game show channel, a reality TV channel, and a news channel.

At step 208, a listing of at least some of the personalized channels is displayed to thereby enable a user to select one of the personalized channels. As mentioned above, this can include displaying the listing of personalized channels (or a portion thereof) along a first one of the four sides of a screen. At step 210, a listing of content associated with one of the personalized channels is displayed. As mentioned above, this can include displaying along a second one of the four sides of the screen, which is perpendicular to the first one of the four sides, a listing of content associated with one of the personalized channels. As was explained above, the listing of programs or other content associated with one of the personalized channels can be ordered based on one or more preferences indicated by the user. At step 212, within a remaining portion of the screen, content that the user most recently selected for viewing can be displayed. FIG. 5 provides an example of what may be displayed to a user as a result of the aforementioned steps being performed. As was noted above, this method can also enable a user to remove one or more channels and/or add one or more new channels. Steps 208-210 can be performed, e.g., by one or more processors that execute instructions stored on one or more processor readable storage devices.

In accordance with an embodiment, at least one of the personalized channels generated and displayed at steps 206-210 provides the user with access to: at least one current (i.e., live) program related to one of the types of content for which the user has an interest; at least one prerecorded program related to the one of the types of content for which the user has an interest; and an indication of at least one upcoming program related to the one of the types of content for which the user has an interest. Where the program is upcoming, the user can be allowed to set a reminder and/or specify that that program be recorded. For example, if a user selects a thumbnail or other button corresponding to an upcoming program, the user can be presented with options to schedule an alert and/or schedule recording of the upcoming program. More generally, a single channel can provide a user with access to live content, prerecorded content and an indication of upcoming content.

Figure 9:
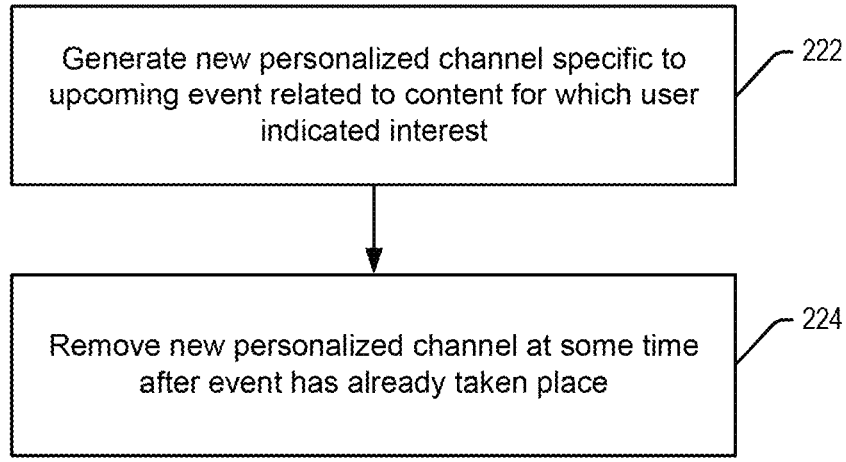

Referring now to FIG. 9, a new personalized channel can be generated that is specific to an upcoming event (e.g., the NFL Super Bowl, or the MLB World Series) that relates to one of the types of content for which the user has indicated an interest, as indicated at step 222. Such a channel may provide access to content even after the event takes place, e.g., by providing access to post game or post show commentary, highlights, and/or the like. Step 222 in FIG. 9 can be implemented as part of step 206 in FIG. 8, and thus, such a new personalized channel and a listing of the content associated therewith may be displayed as part of steps 208 and 210 in FIG. 8. As indicated at step 224 in FIG. 9, such a new personalized channel may be removed at some time (e.g., seven days, or some other time period) after the event has already taken place. In accordance with an embodiment, step 222 is automatically performed in response to receiving an indication that the specific upcoming event (e.g., the NFL Super Bowl) is going to take place within a specified amount of time (e.g., two weeks). Similarly, step 224 can be automatically performed at some time (e.g., one week) after the specific event has taken place. In other words, steps 222 and 224 can be performed without the user needing to personally generate and remove the new channel.

Figure 10:
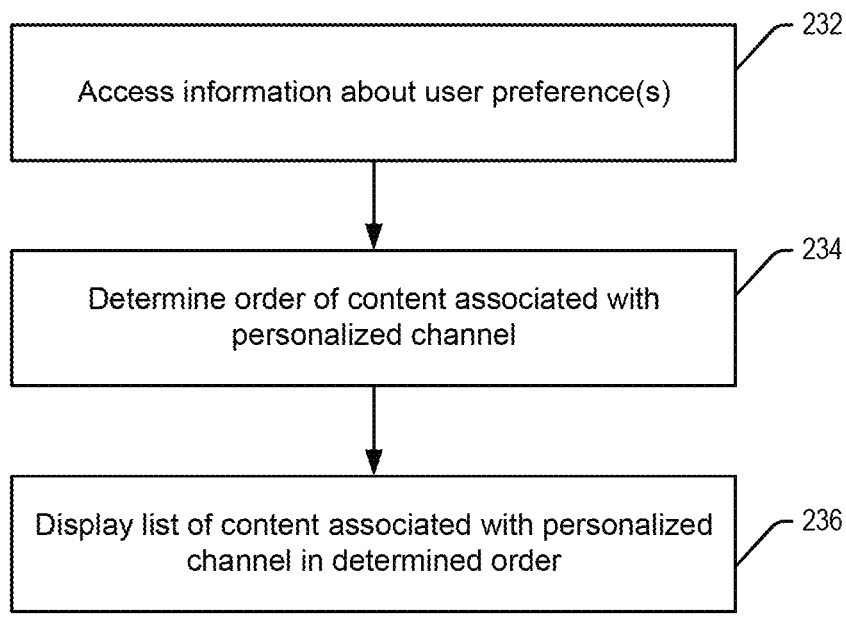

FIG. 10 is used to explain how the listing of content associate with a personalized channel can be ordered. Referring to FIG. 10, at step 232, information about a user's preference(s) is accessed. Such information may be obtained from the user via a user interface (e.g., 102) and/or by tracking a user's viewing habits over time. Such information may be saved and updated from time to time. At step 234, an order is determined based on the user's preference(s) that are accessed at step 232. For example, if the user has a favorite sport (e.g., NFL football) and/or team (e.g., the Seattle Seahawks), content associated with that sport and/or team may be listed earlier than content associated with other sports and/or other teams. At step 236, a listing of content associated with one of the personalized channels is displayed based on the order determined at step 234, and more generally, based on the user's preference(s). In an embodiment, step 232 is implemented as part of step 202 in FIG. 8, step 234 is implemented as part of step 206 in FIG. 8, and step 236 is implemented as part of step 210 in FIG. 8. Other variations are also possible.

FIGS. 11-14 will now be used to describe an exemplary computing system, which may be an entertainment console and tracking system, that can be used to implements embodiments described herein, and exemplary details of the exemplary entertainment console and tracking system.

Figure 11:
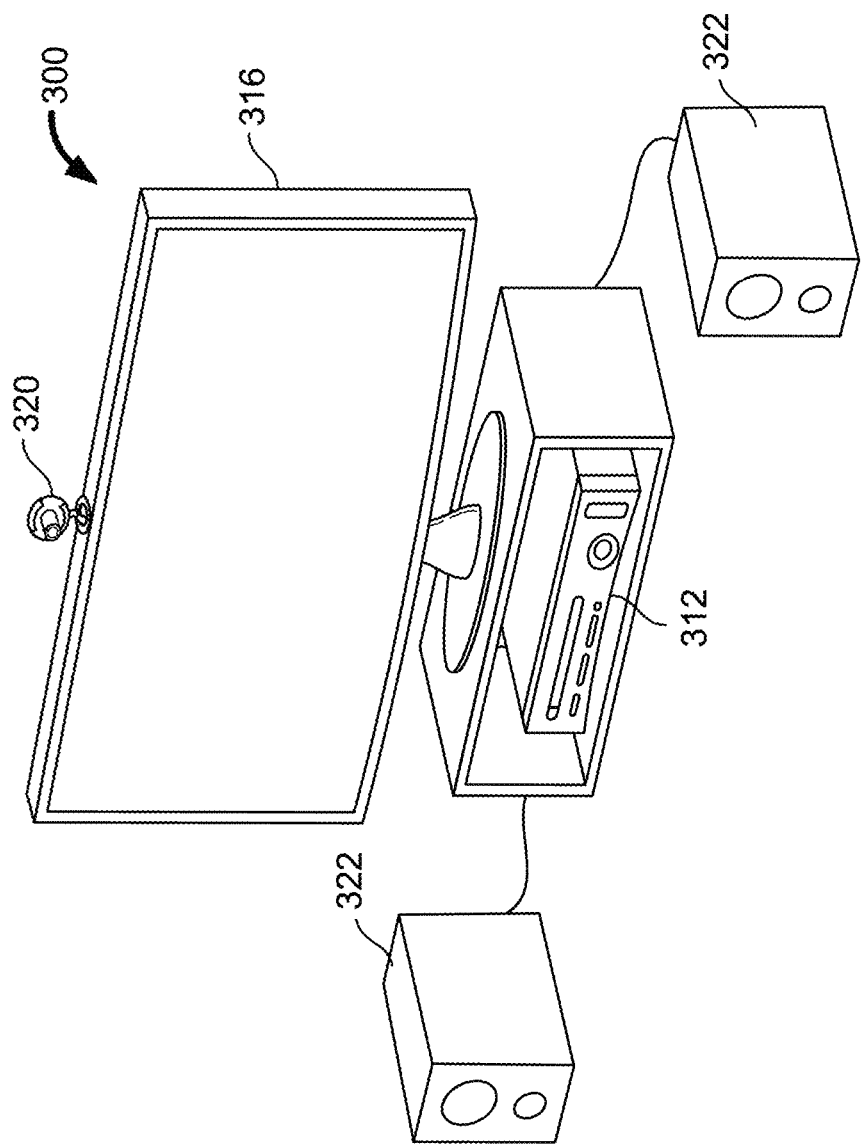
FIG. 11 depicts an example computing system including an entertainment console and tracking system that can be used to implement embodiments described herein.

Referring to FIG. 11, shown therein is an example embodiment of an entertainment system 300 that can provide the user interfaces and content described above. Entertainment system 300 may include a computing system 312. The computing system 312 may be a computer, a gaming system or console, or the like. According to an example embodiment, computing system 312 may include hardware components and/or software components such that computing system 312 may be used to execute applications such as gaming applications, non-gaming applications, or the like. In one embodiment, computing system 312 may include a processor such as a standardized processor, a specialized processor, a microprocessor, or the like that may execute instructions stored on a processor readable storage device for performing the processes described herein. Entertainment system 300 may also include an optional capture device 320, which may be, for example, a camera that can visually monitor one or more users such that gestures and/or movements performed by the one or more users may be captured, analyzed, and tracked to perform one or more controls or actions within an application and/or animate an avatar or on-screen character.

According to one embodiment, computing system 312 may be connected to an audio/visual device 316 such as a television, a monitor, a high-definition television (HDTV), or the like that may provide television, movie, video, game or application visuals and/or audio to a user. For example, the computing system 312 may include a video adapter such as a graphics card and/or an audio adapter such as a sound card that may provide audiovisual signals associated with the game application, non-game application, or the like. The audio/visual device 316 may receive the audio/visual signals from the computing system 312 and may then output the television, movie, video, game or application visuals and/or audio to the user. According to one embodiment, audio/visual device 316 may be connected to the computing system 312 via, for example, an S-Video cable, a coaxial cable, an HDMI cable, a DVI cable, a VGA cable, component video cable, or the like. Audio/visual device 316 may be used to display the user interfaces 100, 112, 116 and 130 described above.

Entertainment system 300 may be used to recognize, analyze, and/or track one or more humans. For example, a user may be tracked using the capture device 320 such that the gestures and/or movements of user may be captured to animate an avatar or on-screen character and/or may be interpreted as controls that may be used to affect the application being executed by computing system 312. Thus, according to one embodiment, a user may move his or her body (e.g., using gestures) to control the interaction with a program being displayed on audio/visual device 316.

Figure 12:
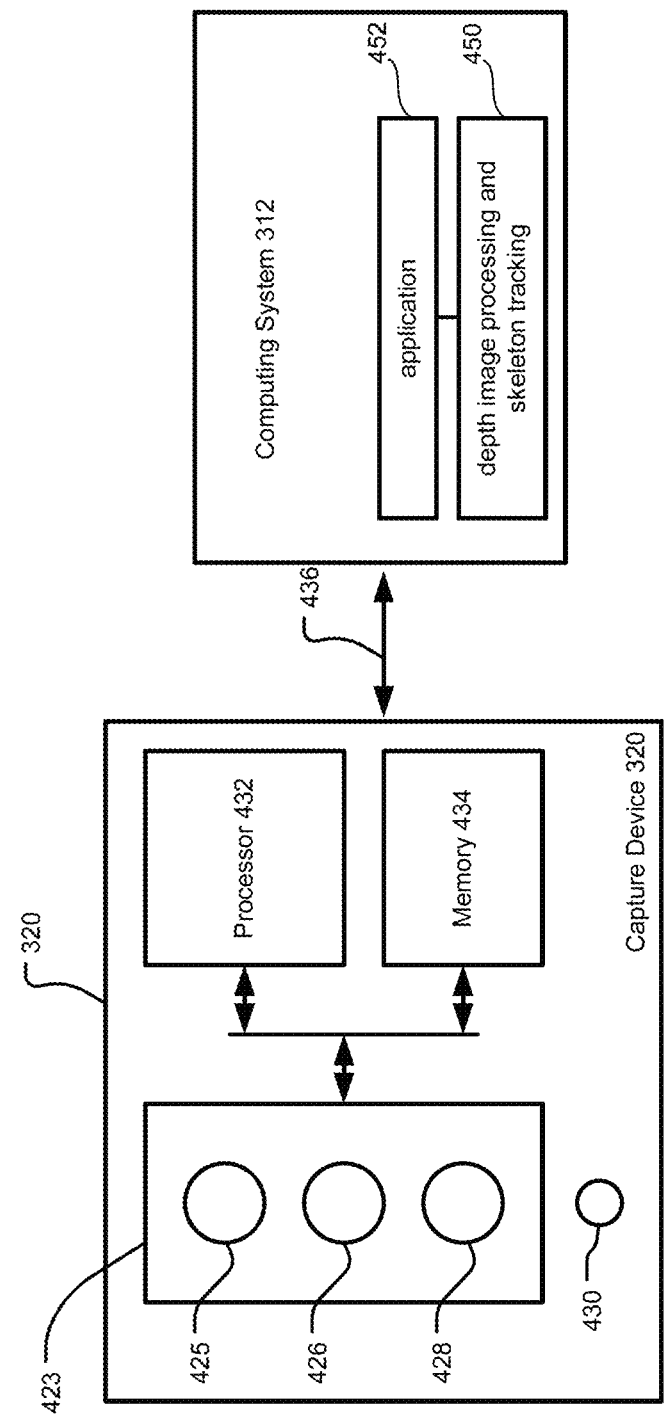
FIG. 12 illustrates additional details of one embodiment of the entertainment console and tracking system introduced in FIG. 11.

FIG. 12 illustrates an example embodiment of the computing system 312 with the capture device 320. According to an example embodiment, the capture device 320 may be configured to capture video with depth information including a depth image that may include depth values via any suitable technique including, for example, time-of-flight, structured light, stereo image, or the like. According to one embodiment, the capture device 320 may organize the depth information into "Z levels," or levels that may be perpendicular to a Z axis extending from the depth camera along its line of sight. Such depth images may be used, e.g., to detect gestures that may be used to navigate through the channel guides described herein.

As shown in FIG. 12, capture device 320 may include a camera component 423. According to an example embodiment, camera component 423 may be or may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

Camera component 423 may include an infra-red (IR) light component 425, a three-dimensional (3-D) camera 426, and an RGB (visual image) camera 428 that may be used to capture the depth image of a scene. For example, in time-of-flight analysis, the IR light component 425 of the capture device 320 may emit an infrared light onto the scene and may then use sensors (in some embodiments, including sensors not shown) to detect the backscattered light from the surface of one or more targets and objects in the scene using, for example, the 3-D camera 426 and/or the RGB camera 428. In some embodiments, pulsed infrared light may be used such that the time between an outgoing light pulse and a corresponding incoming light pulse may be measured and used to determine a physical distance from the capture device 320 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 320 to a particular location on the targets or objects by analyzing the intensity of the reflected beam of light over time via various techniques including, for example, shuttered light pulse imaging.

In another example embodiment, capture device 320 may use a structured light to capture depth information. In such an analysis, patterned light (i.e., light displayed as a known pattern such as grid pattern, a stripe pattern, or different pattern) may be projected onto the scene via, for example, the IR light component 424. Upon striking the surface of one or more targets or objects in the scene, the pattern may become deformed in response. Such a deformation of the pattern may be captured by, for example, the 3-D camera 426 and/or the RGB camera 428 (and/or other sensor) and may then be analyzed to determine a physical distance from the capture device to a particular location on the targets or objects. In some implementations, the IR Light component 425 is displaced from the cameras 425 and 426 so triangulation can be used to determined distance from cameras 425 and 426. In some implementations, the capture device 320 will include a dedicated IR sensor to sense the IR light, or a sensor with an IR filter.

According to another embodiment, the capture device 320 may include two or more physically separated cameras that may view a scene from different angles to obtain visual stereo data that may be resolved to generate depth information. Other types of depth image sensors can also be used to create a depth image.

The capture device 320 may further include a microphone 430, which includes a transducer or sensor that may receive and convert sound into an electrical signal. Microphone 430 may be used to receive audio signals that may also be provided by computing system 312.

In an example embodiment, capture device 320 may further include a processor 432 that may be in communication with the image camera component 423. Processor 432 may include a standardized processor, a specialized processor, a microprocessor, or the like that may execute instructions including, for example, instructions for receiving a depth image, generating the appropriate data format (e.g., frame) and transmitting the data to computing system 312.

Capture device 320 may further include a memory 434 that may store the instructions that are executed by processor 432, images or frames of images captured by the 3-D camera and/or RGB camera, or any other suitable information, images, or the like. According to an example embodiment, memory 434 may include random access memory (RAM), read only memory (ROM), cache, flash memory, a hard disk, or any other suitable storage component. As shown in FIG. 5, in one embodiment, memory 434 may be a separate component in communication with the image capture component 423 and processor 432. According to another embodiment, the memory 434 may be integrated into processor 432 and/or the image capture component 422.

Capture device 320 is in communication with computing system 312 via a communication link 436. The communication link 436 may be a wired connection including, for example, a USB connection, a Firewire connection, an Ethernet cable connection, or the like and/or a wireless connection such as a wireless 802.11b, g, a, or n connection. According to one embodiment, computing system 312 may provide a clock to capture device 320 that may be used to determine when to capture, for example, a scene via the communication link 436. Additionally, the capture device 320 provides the depth information and visual (e.g., RGB) images captured by, for example, the 3-D camera 426 and/or the RGB camera 428 to hub computing system 12 via the communication link 436. In one embodiment, the depth images and visual images are transmitted at 30 frames per second; however, other frame rates can be used. Computing system 312 may then create and use a model, depth information, and captured images to, for example, control an application such as a game or word processor and/or animate an avatar or on-screen character.

Computing system 312 includes depth image processing and skeletal tracking module 450, which uses the depth images to track one or more persons detectable by the depth camera function of capture device 320. Depth image processing and skeletal tracking module 450 provides the tracking information to application 453, which can be a video game, productivity application, communications application, or other software application. The application 452 may alternatively or additionally be a content serving application including the UI channel guide 102 describe above.

Figure 13:
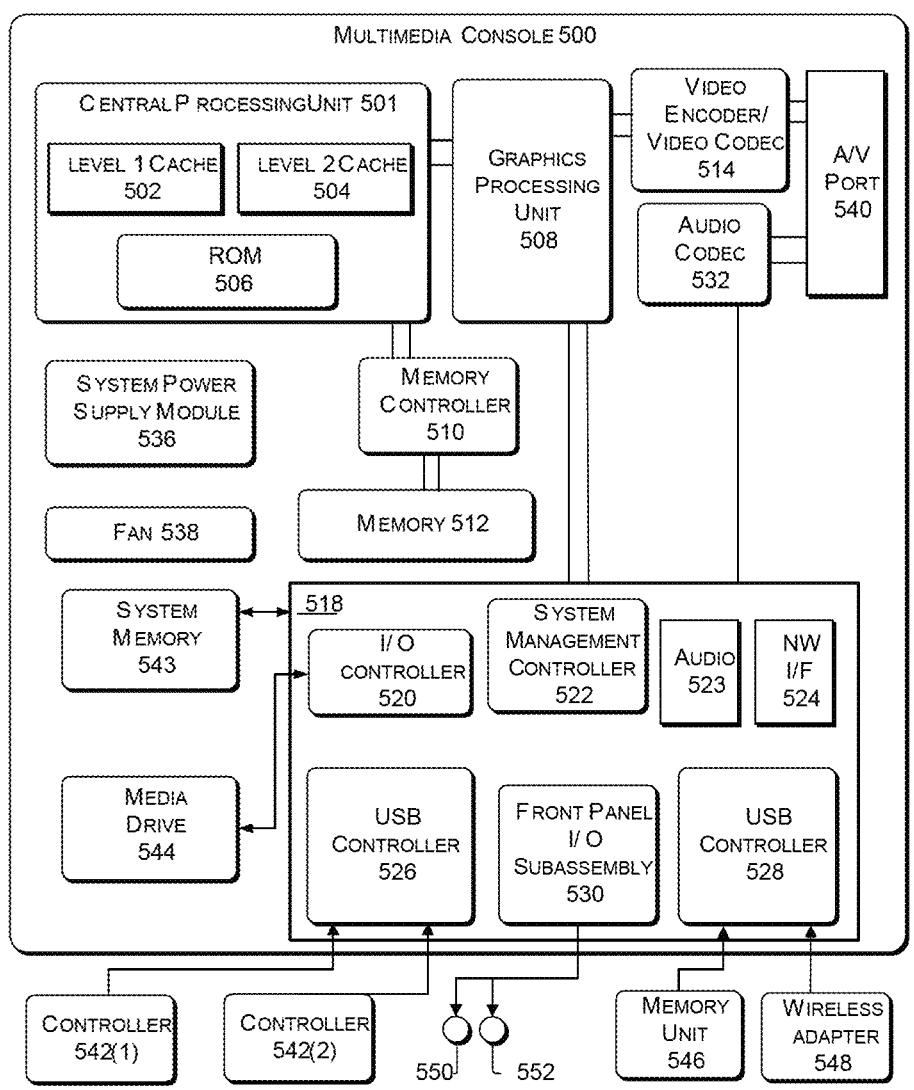
FIG. 13 is a block diagram depicting the components of an example entertainment console.

FIG. 13 illustrates an example embodiment of a computing system that may be used to implement computing system 312. As shown in FIG. 13, the multimedia console 500 has a central processing unit (CPU) 501 having a level 1 cache 502, a level 2 cache 504, and a flash ROM (Read Only Memory) 506 that is non-volatile storage. The level 1 cache 502 and a level 2 cache 504 temporarily store data and hence reduce the number of memory access cycles, thereby improving processing speed and throughput. CPU 501 may be provided having more than one core, and thus, additional level 1 and level 2 caches 502 and 504. The flash ROM 506 may store executable code that is loaded during an initial phase of a boot process when the multimedia console 500 is powered on.

A graphics processing unit (GPU) 508 and a video encoder/video codec (coder/decoder) 514 form a video processing pipeline for high speed and high resolution graphics processing. Data is carried from the graphics processing unit 508 to the video encoder/video codec 514 via a bus. The video processing pipeline outputs data to an A/V (audio/video) port 540 for transmission to a television or other display. A memory controller 510 is connected to the GPU 508 to facilitate processor access to various types of memory 512, such as, but not limited to, a RAM (Random Access Memory).

The multimedia console 500 includes an I/O controller 520, a system management controller 522, an audio processing unit 523, a network (or communication) interface 524, a first USB host controller 526, a second USB controller 528 and a front panel I/O subassembly 530 that are preferably implemented on a module 518. The USB controllers 526 and 528 serve as hosts for peripheral controllers 542(1)-542(2), a wireless adapter 548 (another example of a communication interface), and an external memory device 546 (e.g., flash memory, external CD/DVD ROM drive, removable media, etc. any of which may be non-volatile storage). The network interface 524 and/or wireless adapter 548 provide access to a network (e.g., the Internet, home network, etc.) and may be any of a wide variety of various wired or wireless adapter components including an Ethernet card, a modem, a Bluetooth module, a cable modem, and the like.

System memory 543 is provided to store application data that is loaded during the boot process. A media drive 544 is provided and may comprise a DVD/CD drive, Blu-Ray drive, hard disk drive, or other removable media drive, etc. (any of which may be non-volatile storage). The media drive 144 may be internal or external to the multimedia console 500. Application data may be accessed via the media drive 544 for execution, playback, etc. by the multimedia console 500. The media drive 544 is connected to the I/O controller 520 via a bus, such as a Serial ATA bus or other high speed connection (e.g., IEEE 1394).

The system management controller 522 provides a variety of service functions related to assuring availability of the multimedia console 500. The audio processing unit 523 and an audio codec 532 form a corresponding audio processing pipeline with high fidelity and stereo processing. Audio data is carried between the audio processing unit 523 and the audio codec 532 via a communication link. The audio processing pipeline outputs data to the A/V port 540 for reproduction by an external audio user or device having audio capabilities.

The front panel I/O subassembly 530 supports the functionality of the power button 550 and the eject button 552, as well as any LEDs (light emitting diodes) or other indicators exposed on the outer surface of the multimedia console 100. A system power supply module 536 provides power to the components of the multimedia console 100. A fan 538 cools the circuitry within the multimedia console 500.

The CPU 501, GPU 508, memory controller 510, and various other components within the multimedia console 500 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 500 is powered on, application data may be loaded from the system memory 543 into memory 512 and/or caches 502, 504 and executed on the CPU 501. The application may present a graphical user interface that provides a consistent user experience when navigating to different media types available on the multimedia console 500. In operation, applications and/or other media contained within the media drive 544 may be launched or played from the media drive 544 to provide additional functionalities to the multimedia console 500.

The multimedia console 500 may be operated as a standalone system by simply connecting the system to a television or other display. In this standalone mode, the multimedia console 500 allows one or more users to interact with the system, watch movies, or listen to music. However, with the integration of broadband connectivity made available through the network interface 524 or the wireless adapter 548, the multimedia console 500 may further be operated as a participant in a larger network community. Additionally, multimedia console 500 can communicate with processing unit 4 via wireless adaptor 548.

When the multimedia console 500 is powered ON, a set amount of hardware resources are reserved for system use by the multimedia console operating system. These resources may include a reservation of memory, CPU and GPU cycle, networking bandwidth, etc. Because these resources are reserved at system boot time, the reserved resources do not exist from the application's view. In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop ups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

After multimedia console 500 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 501 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Optional input devices (e.g., controllers 542(1) and 542(2)) are shared by gaming applications and system applications. The input devices are not reserved resources, but are to be switched between system applications and the gaming application such that each will have a focus of the device. The application manager preferably controls the switching of input stream, without knowing the gaming application's knowledge and a driver maintains state information regarding focus switches. Capture device 320 may define additional input devices for the console 500 via USB controller 526 or other interface. In other embodiments, computing system 312 can be implemented using other hardware architectures. No one hardware architecture is required.

Figure 14:
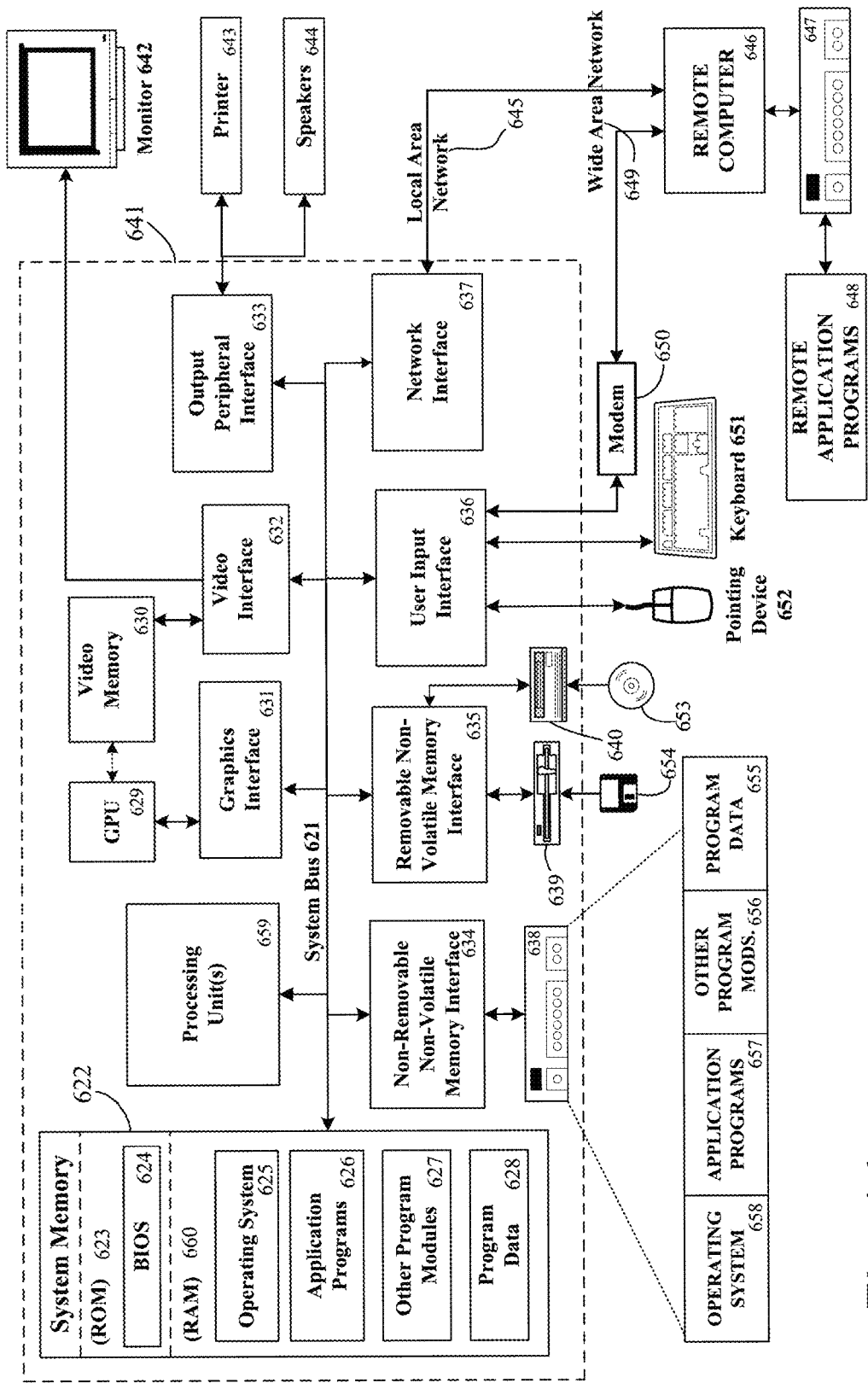
FIG. 14 illustrates another example embodiment of a computing system that can be used to implement embodiments described herein.

FIG. 14 illustrates another example embodiment of a computing system that can be used to implements embodiments described herein. Referring to FIG. 14, the computing system 620 is only one example of a suitable computing system and is not intended to suggest any limitation as to the scope of use or functionality of the presently disclosed subject matter. Neither should the computing system 620 be interpreted as having any dependency or requirement relating to any one or combination of components illustrated in the exemplary computing system 620. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computing system 620 comprises a computer 641, which typically includes a variety of computer readable media. Computer readable media can be any available media that can be accessed by computer 641 and includes both volatile and nonvolatile media, removable and non-removable media. The system memory 622 includes computer storage media in the form of volatile and/or nonvolatile memory such as read only memory (ROM) 623 and random access memory (RAM) 660. A basic input/output system 624 (BIOS), containing the basic routines that help to transfer information between elements within computer 641, such as during start-up, is typically stored in ROM 623. RAM 660 typically contains data and/or program modules that are immediately accessible to and/or presently being operated on by processing unit 659. By way of example, and not limitation, FIG. 14 illustrates operating system 625, application programs 626, other program modules 627, and program data 628.

The computer 641 may also include other removable/non-removable, volatile/nonvolatile computer storage media. By way of example only, FIG. 14 illustrates a hard disk drive 638 that reads from or writes to non-removable, nonvolatile magnetic media, a magnetic disk drive 639 that reads from or writes to a removable, nonvolatile magnetic disk 654, and an optical disk drive 640 that reads from or writes to a removable, nonvolatile optical disk 653 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 638 is typically connected to the system bus 621 through an non-removable memory interface such as interface 634, and magnetic disk drive 639 and optical disk drive 640 are typically connected to the system bus 621 by a removable memory interface, such as interface 635.

The drives and their associated computer storage media discussed above and illustrated in FIG. 14, provide storage of computer readable instructions, data structures, program modules and other data for the computer 641. In FIG. 14, for example, hard disk drive 638 is illustrated as storing operating system 658, application programs 657, other program modules 656, and program data 655. Note that these components can either be the same as or different from operating system 625, application programs 626, other program modules 627, and program data 628. Operating system 658, application programs 657, other program modules 656, and program data 655 are given different numbers here to illustrate that, at a minimum, they are different copies. A user may enter commands and information into the computer 641 through input devices such as a keyboard 651 and pointing device 652, commonly referred to as a mouse, trackball or touch pad. Other input devices (not shown) may include a microphone, joystick, game pad, satellite dish, scanner, or the like. These and other input devices are often connected to the processing unit 659 through a user input interface 636 that is coupled to the system bus, but may be connected by other interface and bus structures, such as a parallel port, game port or a universal serial bus (USB). The cameras 226, 228 and capture device 120 may define additional input devices for the computing system 620 that connect via user input interface 636. A monitor 642 or other type of display device is also connected to the system bus 621 via an interface, such as a video interface 632. In addition to the monitor, computers may also include other peripheral output devices such as speakers 644 and printer 643, which may be connected through a output peripheral interface 633. Capture Device 120 may connect to computing system 620 via output peripheral interface 633, network interface 637, or other interface.

The computer 641 may operate in a networked environment using logical connections to one or more remote computers, such as a remote computer 646. The remote computer 646 may be a personal computer, a server, a router, a network PC, a peer device or other common network node, and typically includes many or all of the elements described above relative to the computer 641, although only a memory storage device 647 has been illustrated in FIG. 14. The logical connections depicted include a local area network (LAN) 645 and a wide area network (WAN) 649, but may also include other networks. Such networking environments are commonplace in offices, enterprise-wide computer networks, intranets and the Internet.

When used in a LAN networking environment, the computer 641 is connected to the LAN 645 through a network interface 637. When used in a WAN networking environment, the computer 641 typically includes a modem 650 or other means for establishing communications over the WAN 649, such as the Internet. The modem 650, which may be internal or external, may be connected to the system bus 621 via the user input interface 636, or other appropriate mechanism. In a networked environment, program modules depicted relative to the computer 641, or portions thereof, may be stored in the remote memory storage device. By way of example, and not limitation, FIG. 14 illustrates application programs 648 as residing on memory device 647. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

What is claimed is:

1. A method for providing a personalized channel guide to a user, comprising:
   receiving indications of types of content for which the user has an interest;
   accessing information about content that is available for viewing;
   generating a plurality of personalized channels for the user based on the received indications of the types of content for which the user has an interest and based on the information about content that is available for viewing,
      wherein at least two of the plurality of personalized channels each provides the user with access to a separate type of content for which the user has an interest, and
      wherein one of the personalized channels, which provides the user with access to one of the types of content for which the user has an interest, provides the user with access to live content, access to pre-recorded content, and an indication of upcoming content, all of which relate to the one of the types of content for which the user has an interest; and
   displaying a listing of at least two of the personalized channels arranged in a column along one of the left or right sides of a screen to thereby enable the user to select one of the personalized channels;
   displaying a listing of content associated with a single one of the personalized channels arranged in a row along one of the bottom or top sides of the screen, perpendicular to the column in which the listing of at least two of the personalized channels are arranged; and
   displaying, within a remaining portion of the screen, video content that the user most recently selected for viewing;
   wherein the remaining portion of the screen, in which the video content that the user most recently selected for viewing is being displayed, is bordered on a first side by the listing of the personalized channels arranged in the column and bordered on a second side, perpendicular to the first side, by the listing of content associated with the single one of the personalized channels arranged in the row;
   wherein the remaining portion of the screen, in which the video content that the user most recently selected for viewing is being displayed, comprises at least fifty percent of an entirety of the screen; and
   wherein the video content being displayed in the remaining portion of the screen is unimpeded by the listing of at least two of the personalized channels arranged in the column, and is also unimpeded by the listing of content associated with the single one of the personalized channels arranged in the row.

2. The method of claim 1, wherein:
   the receiving indications of types of content for which the user has an interest further comprises, for at least one of the types of content for which the user has indicated an interest, receiving an indication of at least one sub-type of content for which the user has a preference; and
   the generating personalized channels is also based on the sub-types of content for which the user has an interest.

3. The method of claim 1, further comprising:
   ordering the listing of content associated with one of the personalized channels based on one or more preferences indicated by the user.

4. The method of claim 1, further comprising:
   enabling a user to remove one or more channels; and
   enabling a user to add one or more new channels.

5. The method of claim 1, wherein the generating personalized channels for the user further comprises:
   generating a new personalized channel specific to an upcoming event that relates to one of the types of content for which the user has indicated an interest; and
   removing the new personalized channel at some time after the event has already taken place.

6. The method of claim 1, wherein one of the personalized channels, which provides the user with access to one of the specific types of content for which the user has an interest, lists content made available by two or more different cable channels, broadcast networks or other content providers.

7. The method of claim 1, wherein a further one of the personalized channels comprises a live personalized channel that provides the user with access to at least two separate programs currently being broadcast that are associated with at least one of the types of content for which the user has an interest.

8. The method of claim 7, wherein displaying the listing of content associated with the single one of the personalized channels arranged in the row along the one of the bottom or top sides of the screen comprises:
   displaying the listing of content associated with the live channel by displaying thumbnails corresponding to at least two separate programs currently being broadcast, that are associated with at least one of the types of content for which the user has an interest, arranged in the row along the one of the bottom or top sides of the screen, perpendicular to the column in which the listing of the personalized channels are arranged.

9. A system for providing a personalized channel guide to a user, comprising:
   a user interface that receives indications of types of content for which the user has an interest;
   one or more storage devices that store information about the types of content for which the user has an interest;
   a network interface that accesses information about content that is available for viewing;
   a display interface that interfaces with a display capable of displaying video content; and
   one or more processors in communication with the one or more storage devices, the network interface, and the display interface,
      wherein the one or more processors generate a plurality of personalized channels for the user based on the received indications of the types of content for which the user has an interest and based on the information about content that is available for viewing,
      wherein at least two of the plurality of personalized channels each provides the user with access to a separate type of content for which the user has an interest,
      wherein a first one of the personalized channels, which provides the user with access to a first one of the types of content for which the user has an interest, provides the user with access to live content, access to prerecorded content, and an indication of upcoming content, all of which relate to the first one of the specific types of content for which the user has an interest, wherein a second one of the personalized channels comprises a live personalized channel that provides the user with access to at least two separate programs currently being broadcast that are associated with at least one of the types of content for which the user has an interest, and wherein the one or more processors cause a listing of at least the first and second ones of the personalized channels to be displayed on the display to thereby enable the user to select one of the first and second ones of the personalized channels and select content accessible via the selected one of the personalized channels.

10. The system of claim 9, wherein:

the user interface, for at least one of the types of content for which the user has indicated an interest, also receives an indication of at least one sub-type of content for which the user has a preference; and wherein the one or more processors also generate personalized channels based on the sub-types of content for which the user has an interest.

11. The system of claim 9, wherein one or more processors cause:

the listing of at least two of the personalized channels to be arranged in a column and displayed along one of the left or right sides of a screen of the display;

a listing of content associated with a single one of the personalized channels to be arranged in a row and displayed along one of the bottom or top sides of the screen, which is perpendicular to the column in which the listing of at least two of the personalized channels are arranged; and video content that the user most recently selected for viewing to be displayed within a remaining portion of the screen that is bordered on a first side by the listing of the personalized channels arranged in the column and bordered on a second side, perpendicular to the first side, by the listing of content associated with the single one of the personalized channels arranged in the row.

12. The system of claim 11, wherein one or more processors cause the listing of content associated with the single one of the personalized channels, arranged in the row and displayed along the one of the bottom or top sides of the screen, to comprise:

the listing of content associated with the live channel displayed as thumbnails corresponding to at least two separate programs currently being broadcast, that are associated with at least one of the types of content for which the user has an interest, arranged in the row along the one of the bottom or top sides of the screen, perpendicular to the column in which the listing of the personalized channels are arranged.

13. The system of claim 11, wherein the one or more processors order the listing of content associated with one of the personalized channels based on one or more preferences indicated by the user.

14. The system of claim 11, wherein the one or more processors also enable a user to remove one or more channels, and enable a user to add one or more new channels.

15. The system of claim 11, wherein the one or more processor generate a new personalized channel specific to an upcoming event that relates to one of the types of content for which the user has indicated an interest; and the one or more processors remove the new personalized channel at some time after the event has already taken place.

16. The system of claim 9, wherein one of the personalized channels, which provides the user with access to one of the specific types of content for which the user has an interest, lists content made available by two or more different cable channels, broadcast networks or other content providers.

17. One or more processor readable storage devices having instructions encoded thereon which when executed cause one or more processors to perform a method for providing a personalized channel guide to a user, the method comprising:

receiving indications of types of content for which the user has an interest;

accessing information about content that is available for viewing;

generating a plurality of personalized channels for the user based on the received indications of the types of content for which the user has an interest and based on the information about content that is available for viewing, wherein at least two of the plurality of personalized channels each provides the user with access to a separate type of content for which the user has an interest, and wherein one of the personalized channels, which provides the user with access to one of the types of content for which the user has an interest, provides the user with access to live content, access to pre-recorded content, and an indication of upcoming content, all of which relate to the one of the types of content for which the user has an interest; and displaying a listing of at least two of the personalized channels arranged in a column along one of the left or right sides of a screen to thereby enable the user to select one of the personalized channels;

displaying a listing of content associated with a single one of the personalized channels arranged in a row along one of the bottom or top sides of the screen, perpendicular to the column in which the listing of at least two of the personalized channels are arranged; and displaying, within a remaining portion of the screen, video content that the user most recently selected for viewing;

wherein the remaining portion of the screen, in which the video content that the user most recently selected for viewing is being displayed, is bordered on a first side by the listing of the personalized channels arranged in the column and bordered on a second side, perpendicular to the first side, by the listing of content associated with the single one of the personalized channels arranged in the row;

wherein the remaining portion of the screen, in which the video content that the user most recently selected for viewing is being displayed, comprises at least fifty percent of an entirety of the screen; and wherein the video content being displayed in the remaining portion of the screen is unimpeded by the listing of at least two of the personalized channels arranged in the column, and is also unimpeded by the listing of content associated with the single one of the personalized channels arranged in the row.

18. The one or more processor readable storage devices of claim 17, wherein:

the receiving indications of types of content for which the user has an interest further comprises, for at least one of the types of content for which the user has indicated an interest, receiving an indication of at least one sub-type of content for which the user has a preference; and the generating personalized channels is also based on the sub-types of content for which the user has an interest.

19. The one or more processor readable storage devices of claim 17, wherein the method further comprises:

ordering the listing of content associated with one of the personalized channels based on one or more preferences indicated by the user.

20. The one or more processor readable storage devices of claim 17, wherein the generating personalized channels for the user further comprises:

generating a new personalized channel specific to an upcoming event that relates to one of the types of content for which the user has indicated an interest; and removing the new personalized channel at some time after the event has already taken place.

* * * * *